United States Patent [19]
Kau et al.

[11] Patent Number: 4,941,972
[45] Date of Patent: Jul. 17, 1990

[54] CHLORINE-STABLE MEMBRANE COMPOSITIONS

[75] Inventors: Jee I. Kau, Concord, Calif.; Dale M. Pickelman, Auburn, Mich.; Donald L. Schmidt; Ritchie A. Wessling, both of Midland, Mich.

[73] Assignee: The Dow Chemical Company, Midland, Mich.

[21] Appl. No.: 678,870

[22] Filed: Dec. 6, 1984

[51] Int. Cl.$^5$ .................... B01D 13/00; B01D 13/01
[52] U.S. Cl. ............................... 210/490; 210/500.23; 210/500.27; 210/500.36; 210/500.42; 210/506
[58] Field of Search ..................... 210/490, 500.2, 506, 210/500.23, 500.27, 500.36, 500.42; 55/158

[56] References Cited

U.S. PATENT DOCUMENTS 4,478,717 10/1984 Kubihara et al. ............... 210/506 X

OTHER PUBLICATIONS

Hawley, Gessner G., *The Condensed Chemical Dictionary*, Tenth Edition, Van Nostrand Reinhold Co., Inc., 1981, p. 122.

*Primary Examiner*—Richard V. Fisher

[57] ABSTRACT

A novel reverse osmosis membrane comprising a hydroxyalkyl methacrylate film cross-linked with a vinylaralkyl dialkylsulfonium salt is described. This film, when cast on a compatible substrate, results in a membrane of exceptional chlorine resistance.

21 Claims, No Drawings

CHLORINE-STABLE MEMBRANE COMPOSITIONS

BACKGROUND OF THE INVENTION

This invention relates to novel membrane compositions. In particular this invention relates to membranes comprising at least one layer which can be prepared by reaction of a polymer derived from a hydroxyalkyl methacrylate and a polymer derived from a vinylaralkyl dialkylsulfonium salt.

The prior art discloses a variety of membranes useful in reverse osmosis. Cellulose acetate membranes, as described in U.S. Pat. Nos. 3,133,132 and 3,133,137, have been used in commercial desalination operations. U.S. Pat. No. 3,567,632 describes certain aromatic polyamide membranes. More recently, composite membranes have been the object of considerable research. See, e.g., U.S. Pat. Nos. 4,005,012, 4,039,440 and 4,277,344.

European Patent Application No. 26,576 describes membranes obtained by crosslinking methylolated vinylphenol polymers These membranes are reported to have excellent water flux, solute rejection and chemical resistance.

In general all of the aforementioned membranes are deleteriously affected if chlorinated water is employed as feed. This frequently necessitates the costly pretreatment of feed water to reduce the chlorine species present to a concentration which will not deleteriously affect the membrane (usually less than 0.1 part per million by weight). Consequently, it would be desirable to develop membrane compositions which offer greater tolerance of chlorine in the water.

SUMMARY OF THE INVENTION

The present invention is directed to a composite material suitable for use as a reverse osmosis or gas separation membrane. This membrane comprises a suitable porous substrate and on the substrate at least one crosslinked selectively permeable film. This selectively permeable film comprises a crosslinked vinyl addition polymer which can be prepared by reaction of a first polymer comprising at least one moiety corresponding to formula I

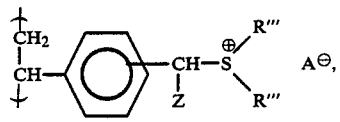 (I)

wherein Z is —H or —CH$_3$, R''' at each occurrence is a C$_1$ to C$_{16}$ monovalent hydrocarbon radical inertly-substituted monovalent hydrocarbon radical having up to 16 carbon atoms or the two R''' are alkylene groups joined by a bond to form with

a sulfur-containing carbocyclic group containing 5 carbon atoms in the ring and A$^\ominus$ is a compatible anion, with a second polymer comprising at least one moiety corresponding to the formula

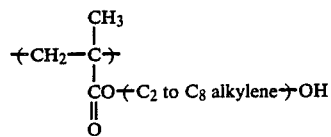 (II)

or

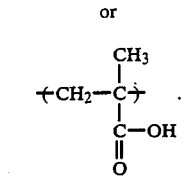 (III)

Optionally, the groups I, II and III can be present on the same polymer prior to crosslinking, and the first and second polymers can be of the same composition. The crosslinked vinyl addition polymer preferably contains a plurality of divalent benzyl ester groups

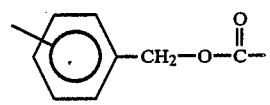

which crosslink the polymer. This invention is also directed to membranes of identical composition to those described hereinbefore, but which are prepared by alternative reactions.

Preferably, the vinyl addition polymer includes at least one crosslinking group, about 10 to about 80 mole percent of moieties corresponding to formula II, 0 to about 20 mole percent of moieties corresponding to formula III, 0 to about 20 mole percent of moieties corresponding to formula IV, and 0 to about 85 percent of moieties corresponding to formula I, V or other non-interfering moieties derived from in situ reaction of the moieties corresponding to formulae I, II or III or from other ethylenically unsaturated monomers. Formulae IV and V are as follows:

 (IV)

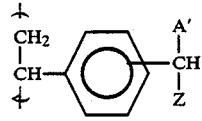 (V)

wherein Z is defined hereinbefore, A' is a monovalent moiety formed by reaction of the group of formula I with a nucleophilic anion and R at each occurrence is independently an alkyl of 1 to 18 carbon atoms or alkylphenoxypolyethyleneoxyethyl of the formula

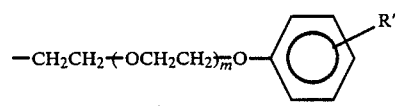

wherein m is an integer from 3 to 40 and R' is an alkyl having 1 to 20 carbon atoms. A' is preferably —OH or —Cl. The crosslinking group preferably corresponds to formula VI:

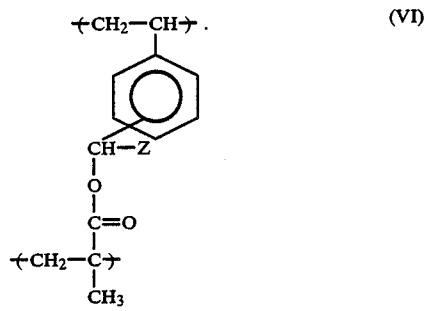

The term selectively permeable denotes a membrane which is more permeable to some fluid components than to other components of a fluid mixture.

DETAILED DESCRIPTION OF THE INVENTION

In a preferred embodiment of this invention, the subject membranes are used in reverse osmosis. The subject reverse osmosis membrane typically will be essentially non-permeable to solute, i.e., the film is solute-rejecting. However, in embodiments of the invention wherein the substrate itself possesses a discriminating (solute-rejecting) layer, the adherent film described herein can be used to enhance the solute-rejection and/or the chlorine-tolerance of the substrate. Although the membrane because of its chlorine tolerance is especially useful in reverse osmosis, it also has utility in the separation of gas mixtures, e.g., oxygen/nitrogen and carbon dioxide/methane.

Substrate

The substrate for the membrane includes a variety of materials known in the prior art. Microporous polyolefins, polysulfones or other polymeric materials are suitable as substrates. Such microporous materials are well known in the prior art. See, e.g., U.S. Pat. Nos. 4,247,498, 4,039,440 and 4,405,688. Of course, these microporous substrates are not solute rejecting.

A variety of prior art materials which are selectively permeable can also be employed as a substrate. For example, polyamide or cellulose ester membranes known in the reverse osmosis prior art are operable as substrates. U.S. Pat. Nos. 4,005,012 and 4,277,344 describe materials exemplary of this type of substrate.

The substrates and membranes described herein can be employed in any one of a number of configurations known in the prior art. For example, the membrane or substrate may be present as a flat film, tubular, spiral or hollow fiber configuration. The hollow fiber configuration is generally preferred for use with feed waters low in particulate matter. The hollow fibers can be arranged in parallel fashion, bias-wrapped or in other configurations known in the prior art. In some preferred embodiments of the invention, the hollow fibers are arranged about a core. The substrate should desirably be of sufficient thickness and strength to maintain integrity under normal operating conditions for the membrane.

Polymer Film

The protective or discriminating film described herein varies in composition depending on the specific properties desired. The composition is determined by choice of precursor polymers and the method of forming the film. Precursor polymers of the desired composition are readily prepared by vinyl addition copolymerization of suitable monomers in accordance with methods known in the prior art. These precursor polymers are then crosslinked, the crosslinking group being a benzyl ester.

Other crosslinking groups, such as benzyl ether moieties, can also be present. More specifically, benzyl chloride moieties or other groups derived from benzyl sulfonium moieties and the compatible anion can react with hydroxyalkyl moieties present to form a benzyloxyalkyl group. Hydroxyalkyl groups are present in the moieties of formula II. Within the preferred range of compositions, increasing the amount of the group corresponding to formula II in the crosslinked coating generally increases the flux of the resulting membrane, but may sacrifice some selectivity.

In one preferred embodiment of the invention, a polymer bearing aralkyl sulfonium salts is reacted with a polymer bearing carboxylate groups in the crosslinking reaction to form the divalent benzyl ester crosslinking group of formula VI. A single polymer can bear both sulfonium salts and carboxylate groups, provided the crosslinking reaction is primarily intermolecular. Alternatively, the sulfonium salts and carboxylate groups can be present on different polymers prior to crosslinking. These polymers are conveniently prepared by free radical initiated copolymerization of a mixture of ethylenically unsaturated monomers comprising vinylaralkyl sulfonium salts, methacrylic acid, hydroxyalkylmethacrylate and optionally a methacrylate ester, each present in the ratio required in the desired polymer. Preferably, the copolymerization is conducted in a solvent which dissolves both the monomers and uncrosslinked polymer. Other monomers can be employed so long as these do not deleteriously affect the selective permeability or other properties of the desired polymer and do not prevent crosslinking by means of the formation of benzyl ester groups, i.e., are non-interfering moieties. The sulfonium moieties on the polymer can also be conveniently prepared by reaction of pendant benzyl halide groups with a dialkyl sulfide.

The vinylaralkyl dialkylsulfonium salts used herein are compounds known in the art. These salts can be conveniently prepared by reaction of the dialkyl sulfide with the corresponding vinylaralkyl chloride. Other salts can be prepared by anion exchange. The anion of the sulfonium can be any anion which does not deleteriously affect the membrane during formation of the thin film on the substrate. Chloride, hydroxide and bicarbonate salts are preferred, with bicarbonate salts being most preferred. The preferred salts correspond to formula

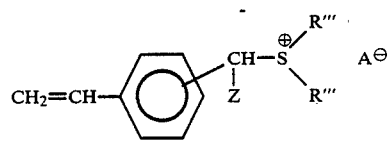

wherein Z is —H or —CH$_3$, R''' at each occurrence is methyl, the phenylene is substituted in the 1 and either 3 or 4 positions and A$^\ominus$ *is a compatible anion. In operable but less preferred embodiments of this invention, R''' can be an alkyl, hydroxyalkyl, or other inertly-substituted alkyl, any of which can have up to* 16 carbon atoms or

can represent a carbocyclic moiety having 4 or 5 carbon atoms in the ring and optionally bearing inert substituents. Inertly-substituted alkyl are moieties which do not have a deleterious affect on the desired reactions described hereinbefore.

Methacrylic acid is the preferred monomer for introducing carboxylate groups into the copolymer structure. In polymerized form, it may be present as the free acid or as the anion of a sulfonium salt. It may be partially or completely neutralized with ammonia or a volatile amine. In the coating process, a sulfonium carboxylate salt should be formed by neutralization or ion exchange before the coating is cured, when a moiety derived from a methacrylic acid monomer is present in the composition to be cured.

The hydroxyalkyl methacrylate compounds employed in preparing the films disclosed hereinbefore are described in U.S. Pat. No. 4,415,455. Monohydroxyalkyl methacrylates are preferred. More preferred are hydroxyethyl or hydroxypropyl methacrylate. Hydroxyethylmethacrylate is the monomer of choice.

The optional fourth component of the film is preferably an ester of methacrylic acid. Preferred ester monomers include those corresponding to the formula

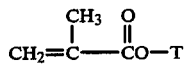

wherein T is

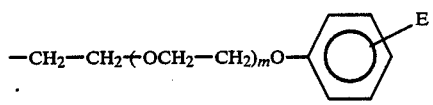

and m is an integer from 3 to about 40 and E is an alkyl having from 4 to 16 carbon atoms. This fourth component can be used to modify the hydrophobicity and film-forming characteristics of the film.

The crosslinked polymer is desirably insoluble in common organic liquid solvents. The density of crosslinking is advantageously high enough to provide the desired insolubility. In general, the polymer is preferably crosslinked through a benzyl ester group at least once per molecule. Two or more crosslinking groups per polymer molecule are preferred. In a preferred embodiment of the invention the polymer prior to cross-linking bears at least one sulfonium group for each carboxylate moiety present. Advantageously, the crosslinked polymer is essentially free of carboxylic acid moieties.

Conveniently, the copolymer from which the films are cast is prepared by conventional addition polymerization in an aqueous solution of tertiary-butanol or other suitable solvent. Preferably, a redox system is employed including both a free-radical initiator e.g., tertiary-butyl hydroperoxide, and a reducing agent, e.g., sodium formaldehyde hydrosulfite. Moderate reaction temperatures, preferably about 20° to about 50° C., are used for polymerization.

The molecular weight of these polymers, as determined by gel permeation chromatography before crosslinking, is advantageously in the range from about 5000 to about 5,000,000, preferably about 12,000 to about 1,000,000. The molecular weight is advantageously selected so as to afford good film forming properties. In a preferred embodiment of this invention, the polymers prior to crosslinking are fractionated by dialysis or other conventional methods to remove those fractions having molecular weights below those preferred.

If the chlorine-tolerance of this layer is of predominant interest, the repeating units of the polymer layer in contact with the feed water are desirably derived principally from hydroxyalkyl methacrylate with vinylbenzylmethacrylate crosslinks or other chlorine-stable crosslinking groups.

If a discriminating layer with good solute rejection and high flux is of interest, the layer desirably is derived from about 30 to about 80 mole percent hydroxyalkyl methacrylate, from about 0 to about 15 mole percent methacrylic acid and from about 10 to about 70 mole percent of the sulfonium moiety. Up to about 5 mole percent of this layer can be derived from methacrylic acid esters.

In a preferred embodiment of the invention, the substrate is first coated with at least one hydroxyalkyl polymer bearing carboxylate or carboxylic acid moieties. A second polymer derived from a vinylaralkyl dialkylsulfonium salt is applied to form a coacervate. The composition is then crosslinked. Alternatively, the sulfonium polymer can be applied first followed by the anionic hydroxyalkyl polymer. In any case, the membrane surface in contact with the feed water can be formulated to afford exceptional chlorine tolerance. Optionally, cationic and anionic polymers can be applied in a plurality of alternating layers to afford the desired solute-rejection and permeability. This embodiment of the invention is referred to herein as a multiple-coated substrate.

In another preferred embodiment of the invention a suitable substrate is coated with a single polymer bearing both hydroxyalkyl methacrylate and sulfonium moieties. Optionally, this polymer can contain up to about 25 mole percent of methacrylic acid or ester moieties. Preferably, the mole ratio of the sulfonium moiety to the hydroxyalkyl methacrylate is in the range from about 2:1 to about 1:3. Advantageously, up to 5 percent of the ester of formula IV can be present in the polymer.

In preparing the described membranes, a coat of the coating polymer dispersed or dissolved in an aqueous medium is applied to the substrate and the solvent evaporated. Suitable co-solvents include methanol, ethanol, n-propanol, isopropanol, t-butanol and the like. The coat can be applied with a blade, brush or by immersion or other conventional techniques. In a preferred embodiment of the invention, flat sheets of the substrate are coated with the coating medium using a blade or coating roller. Optionally, one or more coats of the subject polymers or other polymers can also be applied. If necessary a surfactant or other additives can be used on the substrate or in the coating mixture to make the coatings more uniform. Desirably, these coatings are as thin as possible while maintaining the desired integrity. The substrate and one or more adherent coatings are then heated to a temperature which produces crosslinking. Temperatures in the range from about 25° to about 160° C. for times in the range from about 1 to about 120 minutes are generally operable. Temperatures from about 60° to about 120° for from about 2 to about 20 minutes are preferred. The resulting crosslinked material is desirably rinsed with water to remove dialkyl sulfides or other residue present prior to use.

The subject membranes are employed in the conventional manner. When used as reverse osmosis membranes, solute-containing feed water is brought in contact with one side of the membrane. Preferably the feed water contacts a film on the membrane of the disclosed composition. The subject membranes exhibit good tolerance to low concentrations of compounds attributable to chlorination of the feed water. For example, the preferred membranes will tolerate exposure to water containing 10 parts per million (ppm) $Cl_2$ equivalents for 1000 hours with less than a 5 percent change in both flux and salt rejection. The operating pressure and temperature range and other operating parameters and conditions are typical of those conventionally employed with semipermeable membranes.

The following examples are presented to illustrate the invention. All parts and percentages are by weight unless otherwise indicated.

EXAMPLE 1

To a reaction vessel was charged 305.2 grams (2 moles) of vinyl benzyl chloride, 430 grams of methanol, 248.6 grams (4 moles) of dimethyl sulfide and 1000 milliliters (ml) of deionized water. The resulting mixture was heated at 35° C. for one hour with stirring. To the resulting mixture was added 375 ml of water over a 30 minute period. The mixture was then stirred for another 11 hours. The aqueous mixture was separated, washed with hexane twice, and then concentrated by heating at reduced pressure to give 1742.5 grams of a 20 percent vinylbenzyl dimethylsulfonium chloride (VBDMS+Cl−) solution. The product represents an 81 percent yield.

To a reaction vessel was charged 29.9 grams of hydroxyethyl methacrylate (HEMA), 24 grams of VBDMS[30] Cl− in 96 grams of water, 6.0 grams of p-nonylphenoxynonaethoxy ethyl methacrylate (9N-10MA) in 18 grams of water, 180 grams of t-butanol and 112 grams of water. This mixture was stirred under nitrogen at a temperature of 50° C., while 0.2 gram of t-butyl hydroperoxide in 36 grams water and 0.15 gram of sodium formaldehyde hydrosulfite (sold under the tradename FORMOPON®) in 36 grams water was added in separate streams at a rate of 1.5 ml every 5 minutes for a period of 2 hours. The polymerization was continued for 1 hour. The t-butanol was then removed by evaporation at reduced pressure.

EXAMPLES 2–6

In a manner otherwise generally similar to Example 1, HEMA, VBDMS+Cl−, 9N-10MA and optionally methacrylic acid (MAA) were polymerized for 2 to 4 hours at 50° C. The ratio of reactants and appearance of the product solution after removal of t-butanol is tabulated in Table I.

TABLE I

| Example | Percent Reactants | | | | Product |
|---|---|---|---|---|---|
| | HEMA | VBDMS+Cl− | 9N-10MA | MAA | Appearance |
| 2 | 80 | 10 | 10 | — | Clear* |
| 3 | 60 | 30 | 10 | — | Translucent, Ivory |
| 4 | 50 | 40 | 10 | — | Clear |
| 5 | 55 | 25 | 10 | 10 | Opaque, Ivory |
| 6 | 65.6 | 17.4 | 10 | 7 | Opaque, White |

*After adding small amount of t-butanol.

EXAMPLES 7–16

An additional polymer was prepared by reacting HEMA, 9N-10MA and MAA in a weight ratio of 80:10:10 in the presence of a hydroperoxide initiator. The carboxylic acid moieties on the polymer were reacted with aqueous ammonium hydroxide. The polymer was then converted back to the acid form and separated to enhance its purity. The polymer was diluted to 2 percent in water and neutralized with ammonium hydroxide to a pH of 10.8. A perfluorinated anionic surfactant sold by Minnesota Mining and Manufacturing Co. as FLUORAD® FC-128 was introduced in a concentration of 0.2 percent based on the polymer present.

A microporous polysulfone sheet (sold commercially as Millipore Pellicon PTHK membrane) was washed with deionized water and dried.

The microporous polysulfone sheet was then immersed in the above-described polymer solution for 1 hour under reduced pressure. The coated polysulfone was then lifted from the solution by one edge and allowed to drain for 1 minute. The polysulfone sheet was then dried at 110° C. for 10 minutes.

The polymers prepared in Examples 2–4 and others made in an analogous manner were reacted with an anion exchange resin to replace the chloride anions present with hydroxide anions. The resulting polymers were prepared as 2 percent aqueous solutions with a pH in the range from 10.8 to 12.85. To each solution was added 0.2 or 0.3 percent of FLUORAD® FC-134 cationic surfactant (based on the solids present). Each of these solutions was used to coat one side of the aforementioned coated polysulfone. The sheets were then cured at 110° C. for 20 or 25 minutes. The resulting membrane was soaked overnight in deionized water. A 1.2-square inch membrane section was cut out for testing in each instance. Frequently, multiple membranes of the same composition were prepared.

The percent salt rejection and water flux were measured for each membrane using an aqueous test solution containing 2500 ppm NaCl at 25° C. and a pH of 7 at an operating pressure of 400 or 600 psi with a recovery of less than 1 percent. The composition of the top coat (before conversion to hydroxide form), the pH of the top coat solution, the operating pressure, water flux and salt rejection are tabulated in Table II.

TABLE II

| Example | Top Coat HEMA/VBDMS+Cl−/9N-10MA/MAA | pH | Pressure (psi) | Flux (GFD) | Salt Rejection (%) |
|---|---|---|---|---|---|
| 7 | 80/10/10/0 | 10.8 | 600 | 4.38 | 74.4 |
| 8 | " | " | " | 4.90 | 62.9 |
| 9 | 60/30/10/0 | 12.3 | 400 | 1.25 | 85.2 |
| " | " | " | 600 | 1.84 | 90.6 |
| 10 | " | " | 400 | 0.32 | 95.0 |
| " | " | " | 600 | 0.48 | 97.7 |
| 11 | 50/40/10/0 | " | 400 | 0.71 | 86.0 |
| " | " | " | 600 | 1.05 | 92.1 |
| 12 | " | " | 400 | 0.26 | 95.5 |
| " | " | " | 600 | 0.41 | 97.9 |
| 13 | 20/80/0/0 | 12.85 | 400 | 0.22 | 92.3 |
| 14 | " | " | " | 0.16 | 97.9 |
| 15 | 30/70/0/0 | 12.58 | " | 0.05 | 91.0 |
| 16 | " | " | " | 0.04 | 96.8 |

EXAMPLES 17-23

Twice-coated polysulfone membranes were prepared in the manner of Examples 7, 9, 11 and 15, except that the HEMA/9N-10MA/MAA prime coat was employed at a concentration of 1.5 percent and was dried for 8 minutes at 110° C. The composition of the top coat and the flux and salt rejection at 400 psi are tabulated in Table III.

TABLE III

| Example | Top Coat HEMA/VBDMS+Cl−/9N-10MA/MAA | Flux (GFD) | Salt Rejection (%) |
|---|---|---|---|
| 17 | 30/70/0/0 | 0.10 | 93.2 |
| 18 | 80/10/10/0 | 4.54 | 55.7 |
| 19 | " | 4.04 | 59.8 |
| 20 | 60/30/10/0 | 1.72 | 86.5 |
| 21 | " | 1.24 | 89.8 |
| 22 | 50/40/10/0 | 0.77 | 94.2 |
| 23 | " | 0.71 | 94.5 |

Examples 17-23 demonstrate that increasing the percent HEMA in the top coat generally increases the flux, while increasing the percentage VBDMS+Cl− in the top coat increases the rejection.

EXAMPLES 24-27

Twice-coated polysulfone membranes were prepared in the manner of Example 17, except that the prime coat was employed at a concentration of 0.75 or 0.3 percent. The prime coat concentration as well as the flux and salt rejection at 400 psi are tabulated in Table IV.

TABLE IV

| Example | Prime Coat % Polymer | Flux (GFD) | Salt Rejection (%) |
|---|---|---|---|
| 17 | 1.5 | 0.10 | 93.2 |
| 24 | 0.75 | 0.05 | 91.8 |
| 25 | " | 0.06 | 79.8 |
| 26 | 0.3 | 0.14 | 36.8 |
| 27 | " | 2.52 | 61.9 |

Examples 17 and 24-27 demonstrate that the concentration of the prime coat can affect the uniformity of the coating laid down on the substrate.

EXAMPLES 28-30

A microporous cellulose ester sheet available commercially under the tradename Millipore VS-type filter was employed as the substrate. The HEMA/9N-10MA/MAA terpolymer prepared in Example 7 was converted to its ammonium form and diluted to a concentration of 0.3, 0.75 or 1.5 percent. To each solution was added 0.3 percent (based on solids present) of FLUORAD® FC-128 surfactant. The substrate was immersed in these solutions for one hour under reduced pressure, drained for one minute and then dried at 110° C. for 10 minutes.

The coated substrates were then top-coated on one side in the same manner and with the same solution as in Example 11 and cured at 110° C. for 20 minutes. The prime coat concentration and the flux and salt rejection of the membranes at three pressures using a 2500 ppm NaCl aqueous solution at less than 1 percent recovery are set out in Table V.

TABLE V

| Example | Prime Coat % Polymer | Pressure (psi) | Flux (GFD) | Salt Rejection (%) |
|---|---|---|---|---|
| 28 | 0.3 | 400 | 0.16 | 99.29 |
| " | " | 600 | 0.27 | 99.57 |
| " | " | 800 | 0.33 | 99.69 |
| 29 | 0.75 | 400 | 0.22 | 98.78 |
| " | " | 600 | 0.34 | 99.05 |
| " | " | 800 | 0.45 | 99.32 |
| 30 | 1.5 | 400 | 0.28 | 95.17 |
| " | " | 600 | 0.47 | 96.07 |
| " | " | 800 | 0.54 | 97.21 |

EXAMPLES 31-34

The membranes employed in Examples 9-12 were employed in chlorine stability tests. These membranes were employed with a 2500 ppm NaCl aqueous feed at 400 psi and 25° C. and less than 1 percent recovery. For the first 775 hours of the test the feed water was at a pH of 4.5 and contained 10 ppm Cl$_2$. The membranes were then operated for 72 hours with distilled water. The 10 ppm Cl$_2$ feed was resumed for 96 hours at pH 4.5 followed by 156 hours at pH 8.0. The flux in GFD and percent salt rejection for each membrane are tabulated in Table VI.

TABLE VI

| Operating Conditions | Example 31[a] | | Example 32[b] | | Example 33[c] | | Example 34[d] | |
|---|---|---|---|---|---|---|---|---|
| | Flux | Rejection | Flux | Rejection | Flux | Rejection | Flux | Rejection |
| 10 ppm Cl$_2$ at pH 4.5 | | | | | | | | |

TABLE VI-continued

| Operating Conditions | Example 31[a] | | Example 32[b] | | Example 33[c] | | Example 34[d] | |
|---|---|---|---|---|---|---|---|---|
| | Flux | Rejection | Flux | Rejection | Flux | Rejection | Flux | Rejection |
| After 7 hours | 1.33 | 90.2 | 0.37 | 96.4 | 0.77 | 91.5 | 0.29 | 96.6 |
| After 100 hours | 1.40 | 93.8 | 0.37 | 96.4 | 0.81 | 93.9 | 0.30 | 96.7 |
| After 300 hours | 1.42 | 93.5 | 0.38 | 96.1 | 0.78 | 93.1 | 0.31 | 95.0 |
| After 500 hours | 1.42 | 93.1 | 0.40 | 96.4 | 0.85 | 92.3 | 0.33 | 95.1 |
| After 775 hours | 1.24 | 91.5 | 0.36 | 95.2 | 0.74 | 87.8 | 0.30 | 92.9 |
| Water Feed | 1.56 | — | 0.44 | — | 0.89 | — | 0.34 | — |
| 10 ppm Cl$_2$ at pH 4.5 | | | | | | | | |
| After 18 hours | 1.20 | 87.8 | 0.36 | 93.3 | 0.68 | 85.4 | 0.29 | 92.4 |
| After 96 hours | 1.33 | 92.1 | 0.39 | 94.1 | 0.77 | 90.1 | 0.31 | 93.9 |
| 10 ppm Cl$_2$ at pH 8.0 | | | | | | | | |
| After 37 hours | 1.56 | 69.8 | 0.44 | 85.9 | 0.90 | 69.4 | 0.36 | 88.9 |
| After 156 hours | 1.66 | 70.2 | 0.44 | 89.7 | 0.67 | 68.9 | 0.36 | 88.3 |

[a]Membrane used in Example 9.
[b]Membrane used in Example 10.
[c]Membrane used in Example 11.
[d]Membrane used in Example 12.

Examples 31–34 demonstrate that these performance membranes exhibit superior chlorine tolerance.

EXAMPLE 35

In a manner generally similar to Example 1, HEMA, VBDMS+Cl−, 9N-10MA and MAA were polymerized in a ratio of 49.5:30.5:8:12. The polymer was then passed through a column of DOWEX ® SBR ion exchange resin in hydroxide form to convert the polymer to a zwitterion. A 2 percent solution of the resulting polymer in water along with 0.2 percent on a solids basis FLUORAD ® FC-134 surfactant was coated on a Millipore VS-type cellulose ester filter and cured at 100° C. for 30 minutes. The resulting membrane had a salt rejection of 97% and a flux of 0.6 GFD using a 2500 ppm NaCl feed at 400 psi.

EXAMPLE 36

In a manner generally similar to Example 4, a polymer of HEMA, VBDMS+Cl− and 9N-10MA in a weight ratio of 50:40:10 was prepared. The polymer was then dialyzed to remove polymer present having a molecular weight less than about 12,000. The polymer was then converted to hydroxide form using an ion exchange resin. The high molecular weight polymer fraction was diluted to 1 percent in water, along with 0.3 percent FLUORAD ® FC-134 surfactant on a solid basis.

The aqueous polymer solution was coated using a coating roll on a flat, wettable, microporous polysulfone sheet manufactured by FilmTec Corp. The coated sheet was air-dried at 110° C. in an oven for about 25 minutes. Three samples of the resulting composite membrane had a salt rejection in the range from 96.4 to 98.4 percent and a flux in the range from 2.5 to 3.8 GFD using a 2500 ppm NaCl feed at 400 psi.

EXAMPLE 37

In a manner generally similar to Example 1, a polymer of HEMA, VBDMS+Cl−, 9N-10MA and MAA in a weight ratio of 40:50:5:5 was prepared. The resulting polymer was dialyzed to remove polymer present having a molecular weight less than about 12,000. The polymer was converted to the hydroxide form using an ion exchange resin. The polymer fraction remaining was diluted to 1 percent in water, along with 0.3 percent FLUORAD ® FC-134 surfactant on a solid basis.

The aqueous polymer solution was coated using a coating roll on a flat, wettable, microporous polysulfone sheet. The coated sheet was air-dried at 110° C. for about 25 minutes. Three samples of the resulting composite membrane exhibited salt rejections in the range from 96.3 to 97.7 percent and fluxes in the range from 2.7 to 3.6 GFD using a 2500 ppm NaCl feed at 400 psi.

What is claimed is:

1. A composite membrane comprising a porous substrate and adhering to the substrate at least one selectively permeable film, wherein at least one layer of the film consists essentially of a crosslinked vinyl addition polymer including about 10 to about 80 mole percent of moieties corresponding to formula II, 0 to about 20 mole percent of moieties corresponding to formula III, 0 to about 20 mole percent of moieties corresponding to formula IV, 0 to about 85 mole percent of non-interfering moieties derived from the moieties of formulae II, III or other ethylenically unsaturated moieties and at least one crosslinking group corresponding to formula VI, where formula II is

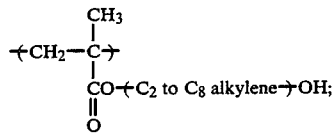

formula III is

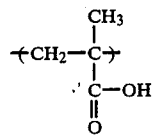

formula IV is

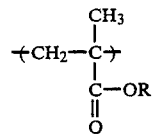

wherein each R is independently C$_1$ to C$_{18}$ alkyl or alkylphenoxypolyethyleneoxyethyl of the formula

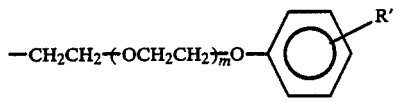

wherein m is an integer from 3 to 40 and R' is $C_1$ to $C_{20}$ alkyl; and formula VI is

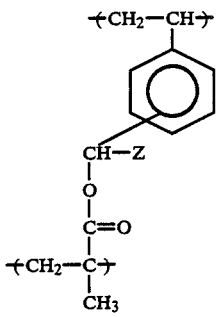

wherein Z is —H or —$CH_3$.

2. The membrane as described in claim 1 wherein the substrate is a microporous polyolefin, polysulfone or derivatives of cellulose.

3. The membrane as described in claim 1 wherein the membrane is a hollow fiber.

4. The membrane as described in claim 1 wherein the membrane is a flat film.

5. The membrane as described in claim 1 further comprising crosslinking groups including benzyl ether moieties.

6. The membrane as described in claim 1 wherein the film is essentially free of carboxylic acid groups.

7. The membrane as described in claim 6 wherein R is an alkylphenoxypolyethyleneoxyethyl.

8. The membrane as described in claim 7 wherein R' is a $C_4$ to $C_{16}$ alkyl.

9. The membrane as described in claim 1 wherein the moiety corresponding to formula II are derived from hydroxyethyl methacrylate or hydroxypropyl methacrylate.

10. The membrane as described in claim 1 wherein the crosslinked polymer consists of from about 60 to about 80 mole percent of moieties of formula II, from about 10 to about 40 mole percent of moieties of formula IV and two or more crosslinking groups of formula VI per molecule.

11. The membrane as described in claim 1 wherein the substrate is a reverse osmosis membrane having a chlorine-sensitive discriminating layer and said chlorine-sensitive layer is coated with the cross-linked vinyl addition polymer.

12. The membrane as described in claim 1 wherein the non-interfering moieties in the vinyl addition polymer consist essentially of moieties corresponding to formula I, V or both moieties, and formula I is:

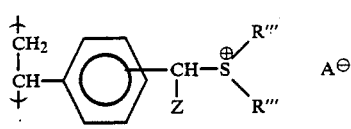

and formula V is

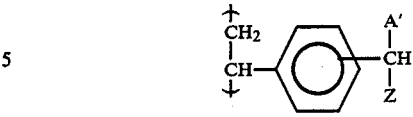

wherein A' is a monovalent radical derived from a nucleophilic anion.

13. The membrane as described in claim 12 wherein A' is —OH or —Cl.

14. A composite membrane comprising a porous substrate and adhering to the substrate at least one selectively permeable film, wherein at least one layer of the film consists essentially of a vinyl addition polymer prepared by reaction of: (a) a first polymer comprising at least one moiety corresponding to formula I

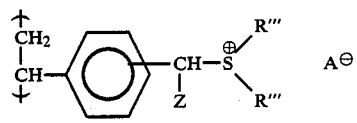

wherein Z is —H or —$CH_3$, R''' at each occurrence is a $C_1$ to $C_{16}$ monovalent hydrocarbon radical or an inertly-substituted monovalent hydrocarbon radical having up to 16 carbon atoms or the two R''' are both alkylene groups joined to form with the sulfonium a sulfur-containing carbocyclic group containing 4 or 5 carbon atoms in the ring and $A^{\ominus}$ is a compatible anion, with (b) a second polymer comprising at least one moiety corresponding to the formula II or III, where formula II is

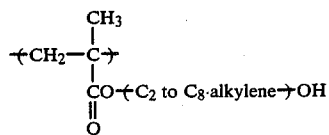

and formula III is

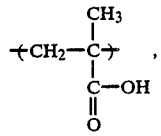

wherein said vinyl addition polymer is crosslinked via a plurality of divalent benzyl ester groups.

15. The membrane as described in claim 14 wherein the substrate is a microporous polyolefin or polysulfone.

16. The membrane as described in claim 14 wherein the first and second polymers each independently consist essentially of moieties corresponding to formula I and formula II and up to about 25 mole percent of moieties corresponding to the formula III or formula IV, where formula IV is

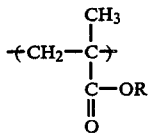

wherein R is either a $C_1$ to $C_{18}$ alkyl or an alkylphenoxy polyethyleneoxyethyl group.

17. The membrane as described in claim 16 wherein the moiety of formula II contains a hydroxyethyl or hydroxypropyl group.

18. The membrane as described in claim 16 wherein the moieties of formula I and formula II are present in a mole ratio (I:II) in the range from about 2:1 to about 1:3 in the second polymer.

19. The membrane as described in claim 18 wherein the first and second polymers are the same and the membrane is prepared by applying a single coat of the polymer to a substrate and crosslinking the polymer coating.

20. The membrane as described in claim 19 wherein the polymer consists essentially of moieties corresponding to formulae I, II and up to 5 mole percent of formula IV.

21. The membrane as described in claim 16 wherein the first polymer consists essentially of moieties corresponding to formulae II, III and IV and the second polymer consists essentially of moieties corresponding to formulae I, II, III and IV.

* * * * *

UNITED STATES PATENT AND TRADEMARK OFFICE
CERTIFICATE OF CORRECTION

PATENT NO. : 4,941,972

DATED : July 17, 1990

INVENTOR(S) : Jee I. Kau, et. al.

It is certified that error appears in the above-identified patent and that said Letters Patent is hereby corrected as shown below:

Column 1, line.65, "containing 5 car-" should read -- containing 4 or 5 car--.

Column 4, line 65, "is a compatible anion. In operable but less preferred embodiments of this invention, R" 'can be an alkyl, hydroxyalkyl, or other inertly-substituted alkyl, any of which can have up to" should read --is a compatible anion. In operable but less preferred embodiments of this invention, R" 'can be an alkyl, hydroxyalkyl, or other inertly-substituted alkyl, any of which can have up to--.

Signed and Sealed this

Twenty-sixth Day of May, 1992

Attest:

DOUGLAS B. COMER

*Attesting Officer*  *Acting Commissioner of Patents and Trademarks*